United States Patent
Kim et al.

(10) Patent No.: US 10,151,360 B2
(45) Date of Patent: Dec. 11, 2018

(54) METHOD FOR CONTROLLING CLUTCH OF VEHICLE

(71) Applicant: HYUNDAI MOTOR COMPANY, Seoul (KR)

(72) Inventors: Jin Sung Kim, Hwaseong-Si (KR); Ju Hyun Nam, Bucheon-Si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 485 days.

(21) Appl. No.: 15/046,222

(22) Filed: Feb. 17, 2016

(65) Prior Publication Data
US 2017/0108063 A1    Apr. 20, 2017

(30) Foreign Application Priority Data

Oct. 20, 2015    (KR) .......................... 10-2015-0145798

(51) Int. Cl.
*F16D 48/08*    (2006.01)

(52) U.S. Cl.
CPC ........ *F16D 48/08* (2013.01); *F16D 2500/106* (2013.01); *F16D 2500/10412* (2013.01); *F16D 2500/30406* (2013.01); *F16D 2500/502* (2013.01)

(58) Field of Classification Search
None
See application file for complete search history.

(56) References Cited

U.S. PATENT DOCUMENTS

| | | | | |
|---|---|---|---|---|
| 5,993,350 A | * | 11/1999 | Lawrie | B60K 6/40 477/5 |
| 6,375,596 B1 | * | 4/2002 | Steeby | B60W 10/06 192/103 F |
| 6,463,821 B1 | * | 10/2002 | Reed, Jr. | F16D 21/06 192/103 C |
| 2006/0161325 A1 | * | 7/2006 | Jiang | B60W 10/02 701/54 |

(Continued)

FOREIGN PATENT DOCUMENTS

| | | |
|---|---|---|
| JP | 2006002917 A | 1/2006 |
| JP | 2010-144851 A | 7/2010 |

(Continued)

OTHER PUBLICATIONS

Office Action dated Oct. 31, 2016 in corresponding Korean Patent Application No. 10-2015-0145798.

*Primary Examiner* — Colby M Hansen
(74) *Attorney, Agent, or Firm* — McDermott Will & Emery LLP

(57) ABSTRACT

A method for controlling a clutch includes judging whether or not a slip amount of the clutch is reduced to below a first reference value by a controller after starting of the vehicle is launched, judging whether or not accumulated slip energy of the clutch until a present time from the launch of starting the vehicle is a second reference value or more, as a result of judgment as to the slip amount of the clutch, if the slip amount of the clutch is below the first reference value, and controlling engagement of the clutch so as to prevent overheating of the clutch while the controller causes an engine to maintain a target engine speed, as a result of the judgment as to the accumulated slip energy, if the accumulated slip energy is the second reference value or more.

7 Claims, 5 Drawing Sheets

(56) References Cited

U.S. PATENT DOCUMENTS

2013/0282247 A1* 10/2013 Burtch ................ F16D 48/062
                 701/67

FOREIGN PATENT DOCUMENTS

| KR | 10-2006-0066609 A | 6/2006 |
|----|-------------------|--------|
| KR | 10-20110051059 A  | 5/2011 |
| KR | 10-20130081299 A  | 7/2013 |

* cited by examiner

METHOD FOR CONTROLLING CLUTCH OF VEHICLE

CROSS-REFERENCE TO RELATED APPLICATION

This application claims the benefit of priority to Korean Patent Application No. 10-2015-0145798, filed on Oct. 20, 2015 with the Korean Intellectual Property Office, the disclosure of which is incorporated herein by reference.

TECHNICAL FIELD

The present disclosure relates to a method for controlling a clutch of a vehicle, and more particularly to a method for controlling a dry clutch of a vehicle loaded with an Automated Manual Transmission (AMT) or a Dual-Clutch Transmission (DCT) using the clutch when the vehicle is started.

BACKGROUND

In general, in an AMT or DCT vehicle using a dry clutch, the clutch may overheat due to continuous slip. Overheating of the clutch may cause a change of characteristics of the clutch and, in some cases, may cause an adverse situation if the clutch is released due to a temporary loss of friction of a clutch disc facing. Since an improvement of characteristics of the facing can be difficult, it is important to control the clutch so as not to cause overheating of the clutch.

Hereinafter, for reference, the term "clutch" means a "dry clutch" unless stated otherwise.

In general, as a slip amount of a clutch increases, a heat generation rate increases. Therefore, when a slip amount of the clutch is reduced, the heat generation rate is decreased. However, if the clutch is connected to a power source, such as an engine or a motor, so as to rapidly reduce the slip amount of the clutch, an impact can be caused. Therefore, in terms of drivability of a vehicle, if a soft feeling needs to be achieved as in starting of a torque converter-type automatic transmission, a method of slowly reducing the slip amount of a clutch is used.

However, if the slip amount of the clutch is slowly reduced on a sloped road, a heat generation rate is greatly increased. Since a presence of a slope corresponds to an increase in a vehicle load, acceleration of the vehicle is decreased and thus the slip amount is more slowly reduced. Consequently, an excessive heat generation rate can result.

The above description has been provided to aid in understanding of the background of the present disclosure and should not be interpreted as conventional technology known to those skilled in the art.

SUMMARY OF THE DISCLOSURE

Therefore, the present disclosure has been made in view of the above problems, and it is an object of the present disclosure to provide a method for controlling a clutch of a vehicle in which slip of the clutch is slowly reduced within the limit not causing overheating of the clutch so that generation of impact during starting of the vehicle is prevented, and overheating of the clutch is prevented by rapidly reducing slip of the clutch in a situation in which an excessive amount of heat is generated in the clutch, so as to assure stability of the vehicle and to improve durability of the clutch.

In accordance with the present disclosure, the above and other objects can be accomplished by the provision of a method for controlling a clutch of a vehicle, the method including judging whether or not a slip amount of the clutch is reduced to be below a first reference value through a controller after starting of the vehicle is launched, judging whether or not accumulated slip energy of the clutch until now, or a present time, from launch of starting of the vehicle is a second reference value or more through the controller, as a result of judgment as to the slip amount of the clutch, if the slip amount of the clutch is below the first reference value, and controlling engagement of the clutch through the controller so as to prevent overheating of the clutch while the controller causes an engine to maintain a target engine speed, as a result of judgment as to the accumulated slip energy, if the accumulated slip energy is the second reference value or more.

Prior to execution of judgment as to the slip amount of the clutch after starting of the vehicle is launched, the controller may set the target engine speed according to the manipulated quantity of an acceleration pedal by a driver, and execute feedback control of the clutch so that the speed of the engine follows the target engine speed until the requirements of judgment as to the slip amount of the clutch are satisfied.

As a result of judgment as to the accumulated slip energy, if the accumulated slip energy is below the second reference value, the controller may control engagement of the clutch according to a target slip reduction rate set to prevent impact generated by engagement of the clutch.

Control of engagement of the clutch according to the target slip reduction rate set to prevent impact may continue to be executed until engagement of the clutch has been completed.

Control of engagement of the clutch so as to prevent overheating of the clutch may continue to be executed until engagement of the clutch has been completed.

The accumulated slip energy of the clutch may be acquired by accumulating a value, acquired by multiplying torque of the clutch by the slip amount of the clutch, from a point of time when starting of the vehicle is launched.

The torque of the clutch may be calculated by a torque observer to receive torque and speed of the engine and thus to estimate the torque of the clutch and the slip amount of the clutch may be calculated as a difference between the speed of the engine and the speed of an input shaft of a transmission.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION OF THE PREFERRED EMBODIMENTS

Figure 1:
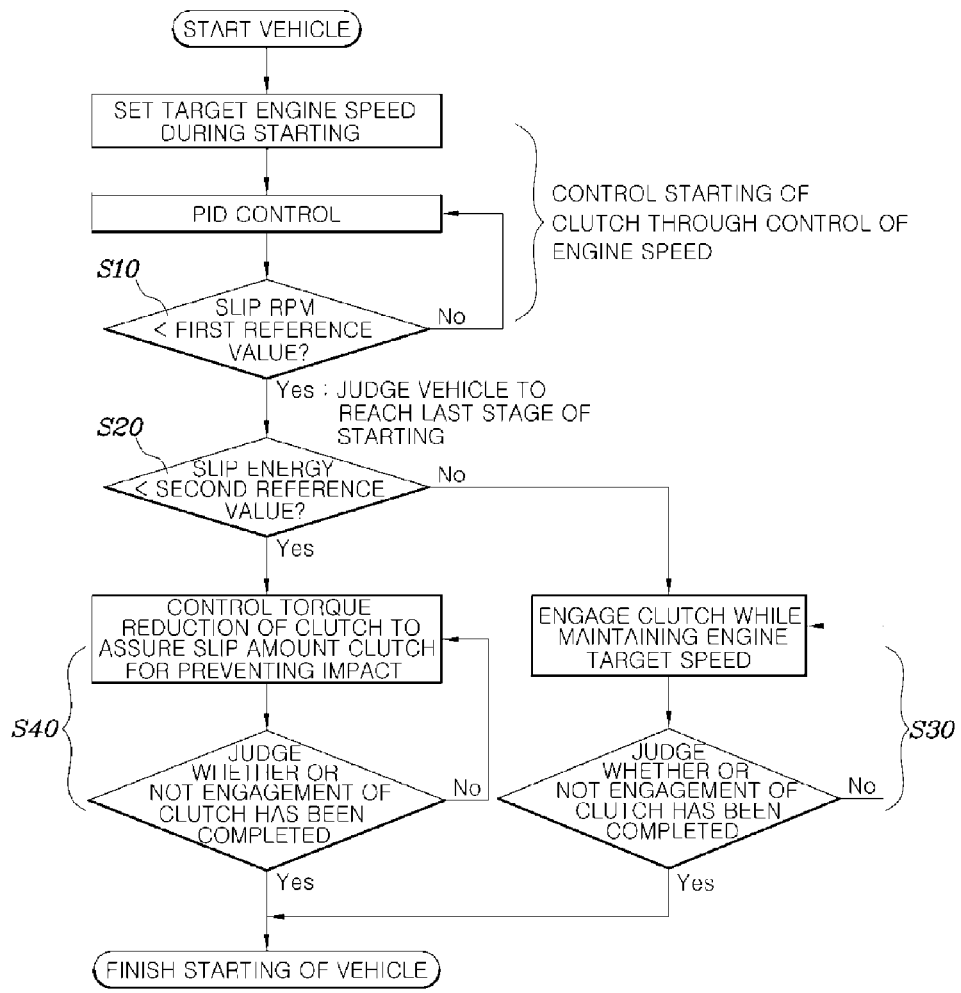
FIG. 1 is a flowchart illustrating a method for controlling a clutch of a vehicle in accordance with one embodiment of the present disclosure.

Reference will now be made in detail to the preferred embodiments of the present disclosure, examples of which are illustrated in the accompanying drawings. Wherever possible, the same reference numbers will be used throughout the drawings to refer to the same or like parts.

With reference to FIGS. 1 to 4, a method for controlling a clutch of a vehicle in accordance with one embodiment of the present disclosure may include judging whether or not a slip amount of the clutch is reduced to be below a first reference value through a controller after starting of the vehicle is launched or initiated (Operation S10), judging whether or not accumulated slip energy of the clutch until now, or a present time, from launch of starting of the vehicle is a second reference value or more through, or using, the controller, as a result of the judgment as to the slip amount of the clutch, if the slip amount of the clutch is below the first reference value (Operation S20), and controlling an engagement of the clutch through the controller so as to prevent overheating of the clutch while the controller causes an engine to maintain a target engine speed, as a result of judgment as to the accumulated slip energy, if the accumulated slip energy is the second reference value or more (Operation S30).

That is, in an embodiment of the method in accordance with the present disclosure, slip energy accumulated in the clutch due to slipping of the clutch during starting of the vehicle is judged and, if there is a possibility of overheating the clutch, the clutch is rapidly engaged although impact is applied to the vehicle, thereby suppressing additional slip of the clutch and consequently preventing overheating of the clutch.

Of course, if the slip energy accumulated in the clutch during starting of the vehicle is not high and there is no possibility of overheating the clutch, Operation S40, which will be described later, may be executed to prevent an impact to the vehicle and to promote a smooth engagement of the clutch.

Therefore, in accordance with the present disclosure, in a situation in which there is no possibility of overheating the clutch, the clutch can be smoothly engaged to prevent an impact applied to the vehicle and, in a situation in which there is a possibility of overheating the clutch, slip of the clutch is rapidly reduced to prevent overheating of the clutch, thereby assuring stability of the vehicle and improving durability of the clutch.

In this embodiment, prior to execution of Operation S10 after a starting of the vehicle is launched, or initiated, the controller sets the target engine speed according to the manipulated quantity of an acceleration pedal by a driver and executes a feedback control of the clutch so that the speed of the engine follows the target engine speed until the requirements of Operation S10 are satisfied.

That is, when the driver presses the acceleration pedal and thus starting of the vehicle is launched, the controller may select a target engine speed corresponding to a manipulated quantity of the acceleration pedal by the driver from a target engine speed map and may execute feedback control of the clutch so that the speed of the engine follows the target engine speed. Such a target engine speed may be substantially equal to the target engine speed used in Operation S30.

For example, the manipulated quantity of the acceleration pedal may be a signal value from an acceleration position sensor (APS).

Further, feedback control of the clutch substantially refers to control of torque transmitted to the clutch by repetitively controlling a clutch actuator by the controller, and such feedback control may be executed through a conventional feedback control method, such as Proportional Integral (PI) control or Proportional Integral Derivative (PID) control.

As a result of a judgment as to the accumulated slip energy (Operation S20), if the accumulated slip energy is below the second reference value, the controller may control engagement of the clutch according to a target slip reduction rate set to prevent impact generated by an engagement of the clutch (Operation S40).

That is, in one case, although the clutch may slip more, there is no possibility of overheating the clutch and thus generation of impact on the vehicle may be prevented and a sense of smooth starting of the vehicle may be assured through smooth clutch engagement.

Operation S40 and Operation S30 may continue to be executed until engagement of the clutch has been completed, thereby finishing a starting of the vehicle.

Here, the first reference value used in Operation S10 may be defined as a slip amount of the clutch that is enough to confirm whether or not starting of the vehicle is almost completed and the vehicle reaches the last stage of starting. In consideration of purposes of the present disclosure, in Operation S30, the speed of the engine is not increased slightly above the target engine speed so that the clutch is engaged while slip of the clutch is gradually reduced, but the speed of the engine may continuously follow the target engine speed and the clutch may be engaged so that the slip amount of the clutch is rapidly reduced and thus determined to be within a range within which a generated impact is reasonably tolerated so as to prevent overheating of the clutch.

For example, the first reference value may be set to be below 100 RPM, i.e., a level at which starting of the vehicle will be completed soon.

The accumulated slip energy of the clutch may be acquired by accumulating a value, acquired by multiplying torque of the clutch by the slip amount of the clutch, from a point of time when starting of the vehicle is launched. The second reference value with which the accumulated slip energy is compared may be set based on, if the clutch continues to slip, whether or not there is a possibility of overheating the clutch to have a negative influence on the clutch, in consideration of purposes of the present disclosure.

Therefore, the second reference value may be set to be a level at which a possibility of overheating the clutch begins to show through many starting tests and analyses.

Figure 2:
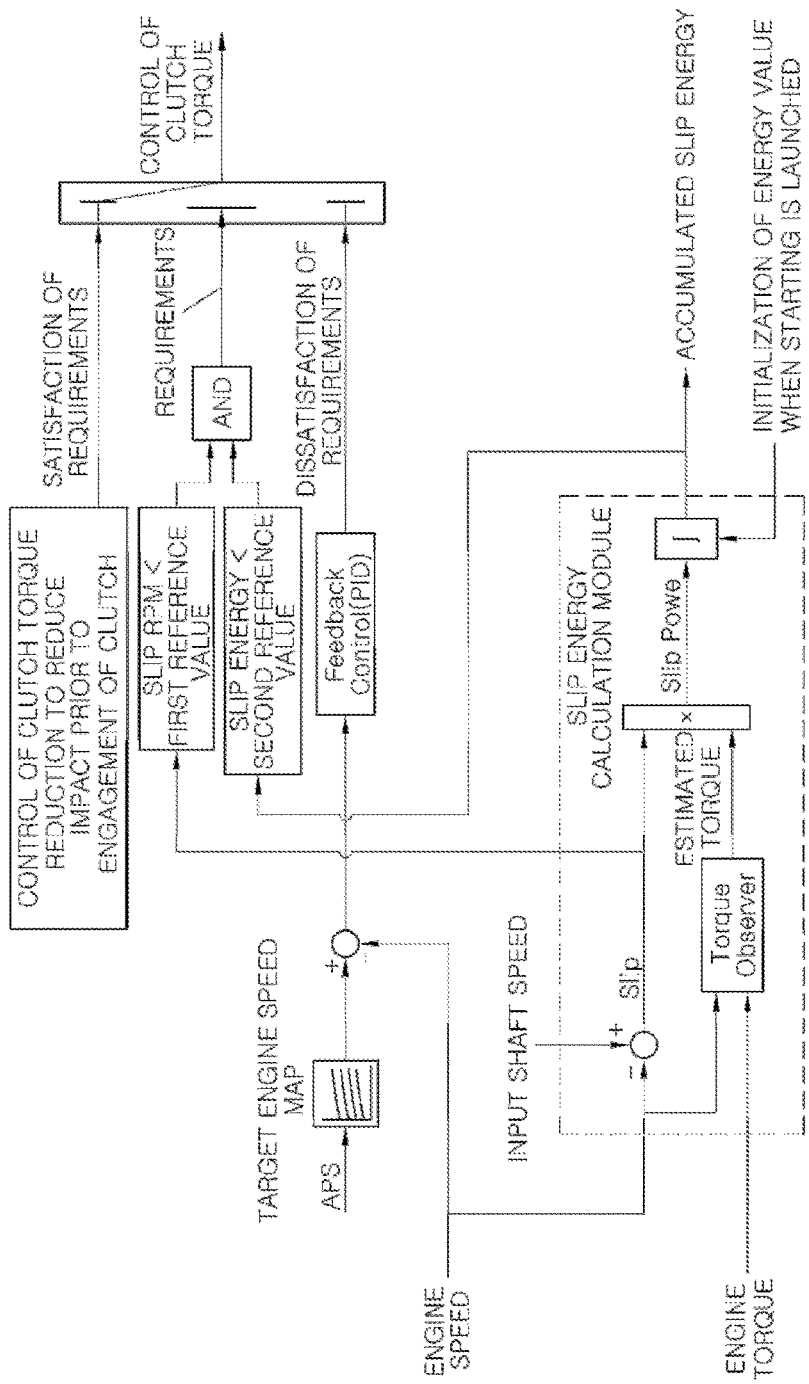
FIG. 2 is a block diagram illustrating the method of FIG. 1 in accordance with an embodiment of the present disclosure.

With reference to FIG. 2, a torque of the clutch may be calculated by a torque observer which receives a torque and a speed of the engine and thus estimates a torque of the clutch, and the slip amount of the clutch may be calculated as a difference between the speed of the engine and the speed of an input shaft of the transmission.

Figure 3:
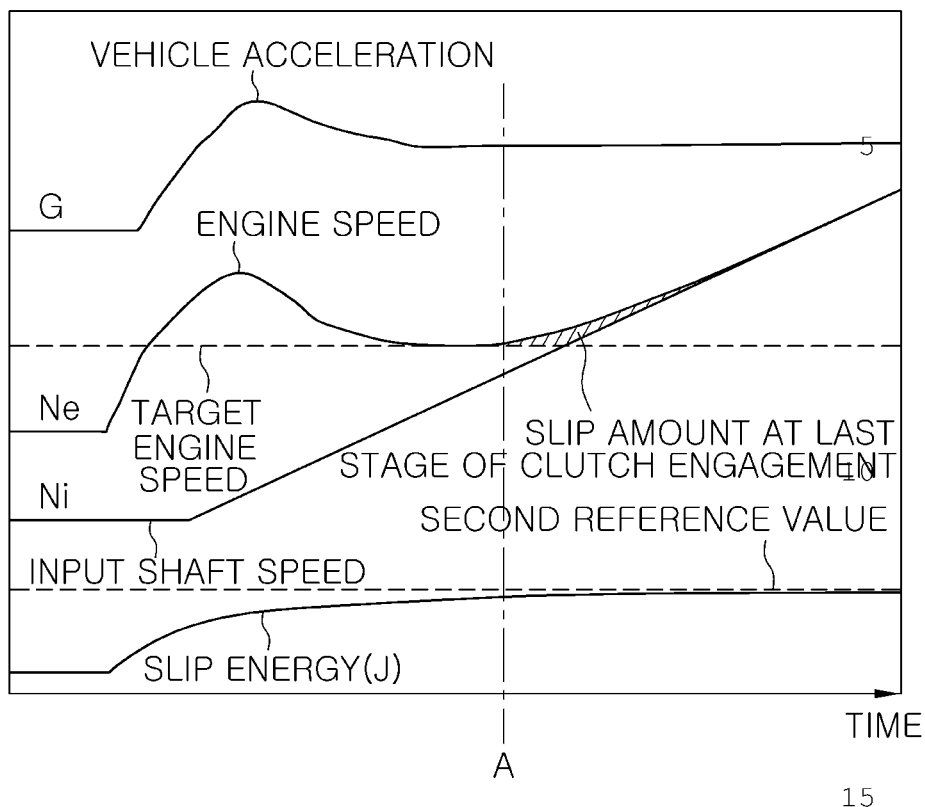
FIG. 3 is a graph illustrating an execution of prevention of overheating in accordance with an embodiment of the present disclosure.

FIG. 3 is a graph illustrating a speed Ne of the engine, a speed Ni of the input shaft of the transmission, an acceleration G of the vehicle, and accumulated slip energy according to a time lapse if prevention of overheating (Operation S30) is executed. When the vehicle is started, the speed of the engine may follow the target engine speed, the clutch may be engaged while slipping, the speed of the input shaft of the transmission may reach the speed of the engine, and, upon judging that the slip amount of the clutch is below the first reference value at time A, judgment as to accumulated slip energy (Operation S20) may be executed. Here, since the accumulated slip energy may already exceed the second reference value, prevention of overheating (Operation S30) may be executed, the clutch may be immediately engaged by controlling the clutch so that the engine maintains the target engine speed and, thus, the speed of the input shaft of the transmission is rapidly synchronized with the speed of the engine. By immediately engaging the clutch, the acceleration of the vehicle is changed and, thus, impact may be generated.

Figure 4:
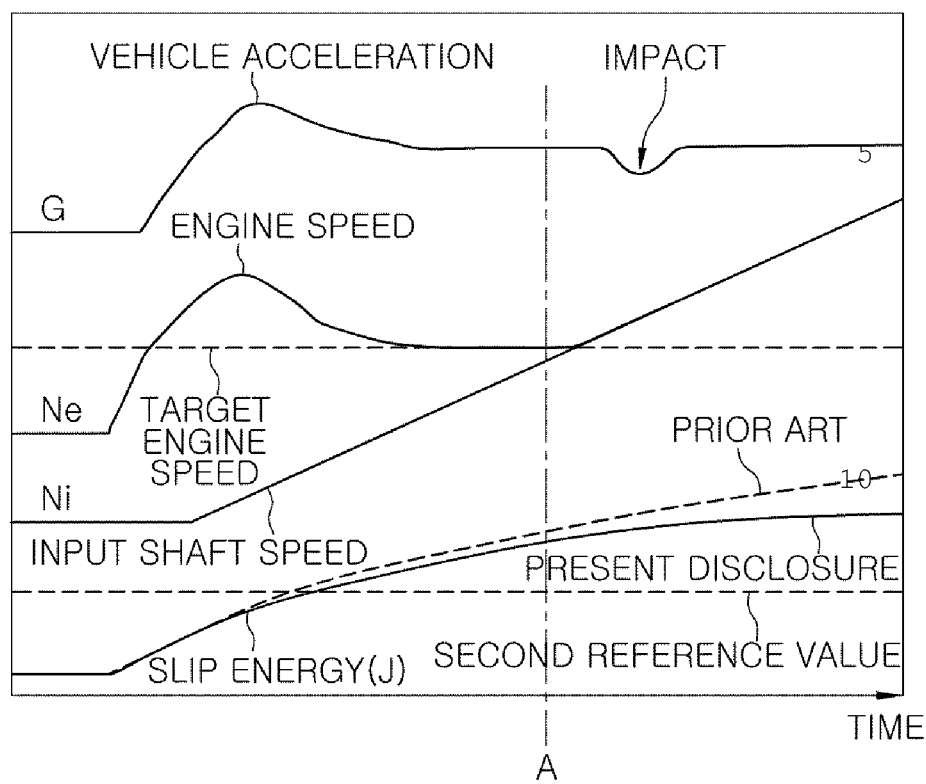
FIG. 4 is a graph illustrating an execution of prevention of an impact in accordance with an embodiment of the present disclosure.

FIG. 4 is a graph illustrating an execution of prevention of impact (Operation S40). Such a graph illustrates a situation in which, since the accumulated slip energy at a point of time A is below the second reference value, slip of the clutch is slowly reduced according to a target slip reduction rate and thus starting of the vehicle is completed without generation of impact.

Therefore, the target slip reduction rate may be set to be a level, at which an impact of the vehicle is not generated and smooth starting of the vehicle is completed during starting, through many tests and analyses.

Figure 5:
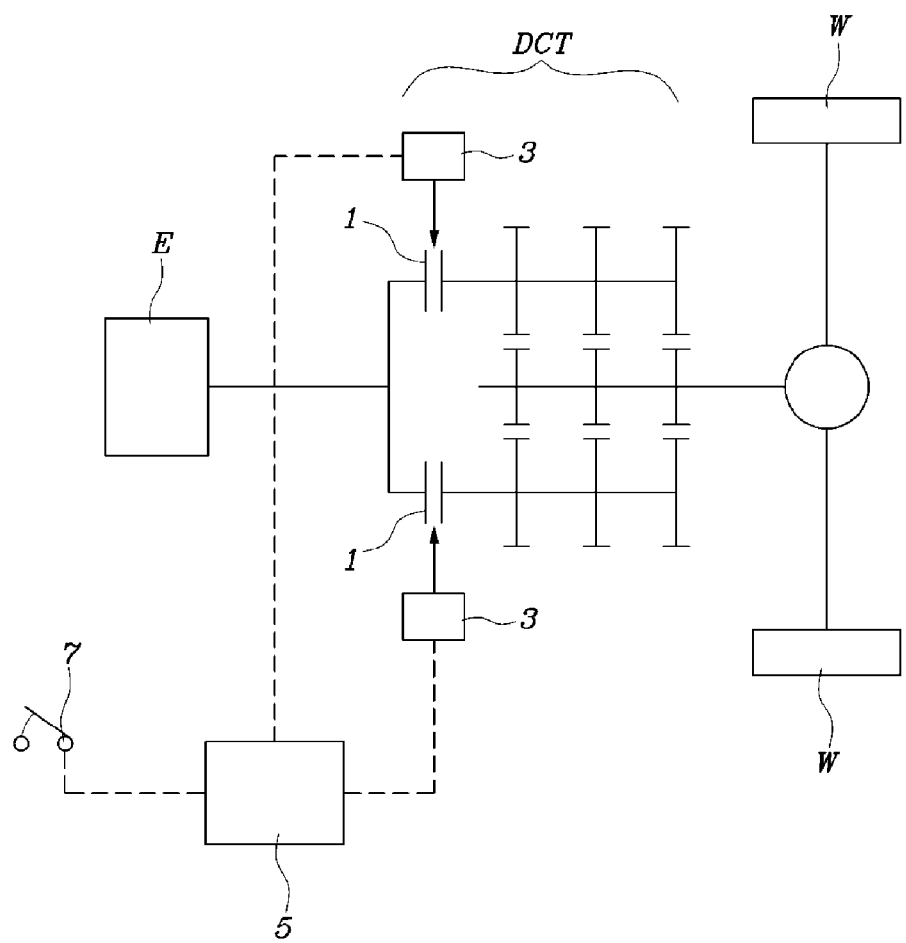
FIG. 5 is a view illustrating a configuration of a DCT to which an embodiment of the present disclosure is applicable.

For reference, FIG. 5 is a view illustrating a configuration of a DCT to which the present disclosure may be applicable. Power of an engine E may be supplied to driving wheels W through a dual clutch transmission (DCT). Two clutches 1 of the DCT are respectively controlled by clutch actuators 3, the clutch actuators 3 are controlled by a controller 5, and the controller 5 receives a signal from an accelerator position sensor (APS) 7 to receive the manipulated quantity of an acceleration pedal.

The controller 5 may be configured to provide information, such as torque and speed of the engine E, etc.

As is apparent from the above description, in a method for controlling a clutch of a vehicle in accordance with one embodiment of the present disclosure, slip of the clutch is slowly reduced within the limit not causing overheating of the clutch so that impact is not generated during starting of the vehicle. Overheating of the clutch is prevented by rapidly reducing slip of the clutch in a situation in which an excessive amount of heat is generated in the clutch, thereby assuring stability of the vehicle and improving a durability of the clutch.

Although the preferred embodiments of the present disclosure have been disclosed for illustrative purposes, those skilled in the art will appreciate that various modifications, additions and substitutions are possible, without departing from the scope and spirit of the disclosure as disclosed in the accompanying claims.

What is claimed is:

1. A method for controlling a clutch of a vehicle comprising:

judging whether or not a slip amount of the clutch is reduced to below a first reference value by a controller after starting of the vehicle is launched;

judging whether or not accumulated slip energy of the clutch until a present time from the launch of starting the vehicle is a second reference value or more through the controller, as a result of judgment as to the slip amount of the clutch, if the slip amount of the clutch is below the first reference value; and controlling engagement of the clutch through the controller so as to prevent overheating of the clutch while the controller causes an engine to maintain a target engine speed, as a result of the judgment as to the accumulated slip energy, if the accumulated slip energy is the second reference value or more.

2. The method according to claim 1, wherein, prior to the step of judgment as to the slip amount of the clutch after starting of the vehicle is launched, the controller sets the target engine speed according to the manipulated quantity of an acceleration pedal by a driver, and executes feedback control of the clutch so that the speed of the engine follows the target engine speed until the requirements of the judgment as to the slip amount of the clutch are satisfied.

3. The method according to claim 1, wherein, as a result of the step of judgment as to the accumulated slip energy, if the accumulated slip energy is below the second reference value, the controller controls engagement of the clutch according to a target slip reduction rate set to prevent an impact generated by engagement of the clutch.

4. The method according to claim 3, wherein control of engagement of the clutch according to the target slip reduction rate set to prevent impact continues to be executed until engagement of the clutch has been completed.

5. The method according to claim 1, wherein control of engagement of the clutch so as to prevent overheating of the clutch continues to be executed until engagement of the clutch has been completed.

6. The method according to claim 1, wherein the accumulated slip energy of the clutch is acquired by accumulating a value, acquired by multiplying torque of the clutch by the slip amount of the clutch, from a point of time when starting of the vehicle is launched.

7. The method according to claim 6, wherein:

the torque of the clutch is calculated by a torque observer that receives a torque and a speed of the engine and thus estimates the torque of the clutch; and the slip amount of the clutch is calculated as a difference between the speed of the engine and the speed of an input shaft of a transmission.

* * * * *